United States Patent [19]

Norling

[11] Patent Number: 5,599,226
[45] Date of Patent: Feb. 4, 1997

[54] METHOD AND PLANT FOR SEPARATING A PART FROM A CARCASS

[76] Inventor: Lars-Erik Norling, Valhallsvägen 49, S-262 00 Ängelholm, Sweden

[21] Appl. No.: 583,117

[22] PCT Filed: Jul. 15, 1994

[86] PCT No.: PCT/SE94/00694

§ 371 Date: Jan. 16, 1996

§ 102(e) Date: Jan. 16, 1996

[87] PCT Pub. No.: WO95/02331

PCT Pub. Date: Jan. 26, 1995

[30] Foreign Application Priority Data

Jun. 16, 1993 [SE] Sweden ................................ 9302447

[51] Int. Cl.⁶ .................................................... A22C 17/02
[52] U.S. Cl. ............................................ 452/149; 452/187
[58] Field of Search .................................... 452/187, 149, 452/177, 178, 182

[56] References Cited

U.S. PATENT DOCUMENTS 3,940,830 3/1976 Anderson et al. ...................... 452/149
4,985,963 1/1991 Norling .................................. 452/187

FOREIGN PATENT DOCUMENTS

| 0235001 | 9/1987 | European Pat. Off. . |
| 0300940 | 1/1989 | European Pat. Off. . |
| 0443101 | 8/1991 | European Pat. Off. . |
| 1214942 | 4/1960 | France . |
| 0440175 | 7/1985 | Sweden . |
| 8808250 | 11/1988 | WIPO . |

*Primary Examiner*—Willis Little
*Attorney, Agent, or Firm*— Ladas & Parry

[57] ABSTRACT

The invention provides a plant for separating a part from a carcass comprising a main conveyor (1) for transporting the carcass (2) hanging in a first meat-hook (4) the main conveyor. According to the invention a separate work station (3) is arranged near the main conveyor (1) for separating and forwarding the separated part. The work station comprises a second meat-hook (5) or the like for attachment to the part to be separated and means (6, 6') for moving the second meat-book. This movement may be determined arbitrarily either through a predetermined timing program controlling the moving means or directly by an operator.

24 Claims, 1 Drawing Sheet

METHOD AND PLANT FOR SEPARATING A PART FROM A CARCASS

FIELD OF THE INVENTION

The present invention relates to a method and a plant for separating a part from a carcass, i.e. the cutting-up of slaughtered animals, especially cattle. The invention may be applied in cutting plants already equipped with an existing line for transport of hanging carcasses, with automatization, but may also be applied in the construction of new plants in order to accomplish an especially advantageous exploitation of the available space.

STATE OF THE ART

It is previously known to perform cutting-up of meat being transported suspended from a conveyor. See for instance Applicant's Swedish Patent No. 8701726-5. According to the prior art separating forces are applied on different parts of the carcass by various supports or by direct actuation of meat-hooks attached to the carcass. A problem in the prior art is that the forces can only be governed in one direction, i.e. in parallel with the conveyor and any reciprocating movement was not possible. Substantial advantages would be obtained if the relative movement between the meat-hooks could be controlled vertically and horizontally back and forth as well.

The present invention solves the problem by providing a separate work station enabling arbitrary movement of a meat-hook or the like.

SUMMARY OF THE INVENTION

Accordingly, the present invention provides a plant for separating a part from a carcass comprising a main conveyor for transporting the carcass hanging in a first meat-hook or the like on the main conveyor. According to the invention a separate work station is arranged near the main conveyor for separating and forwarding the separated part. The work station comprises a second meat-hook or the like for attachment to the part to be separated and means for moving the second meat-hook. This movement may be determined arbitrarily either through a predetermined timing program controlling the moving means or directly by an operator.

Preferably the work station comprises a separate conveyor portion for separating a part and transporting this to another line, conveyor or work station. Preferably a carrier is suspended in the conveyor portion for movement along this. The carrier comprises a support rail for supporting the second meat-hook and hook stops provided on the support rail for holding the second meat-hook and releasing it when linking to a subsequent conveyor or the like. The carrier may be raised and lowered relative to the main conveyor and/or may be turned in a vertical plane.

According to the invention a plurality of separate work stations may be arranged at the main conveyor, each in an individual angle to the main conveyor and having an individually controlled mode of operation.

The invention also comprises a method for separating a part from a carcass.

The invention is set forth in further detail in the appended claims.

BRIEF DESCRIPTION OF THE DRAWINGS

The invention will now be described in detail with reference to appended drawings, in which.

DETAILED DESCRIPTION OF PREFERRED EMBODIMENTS

Figure 1:
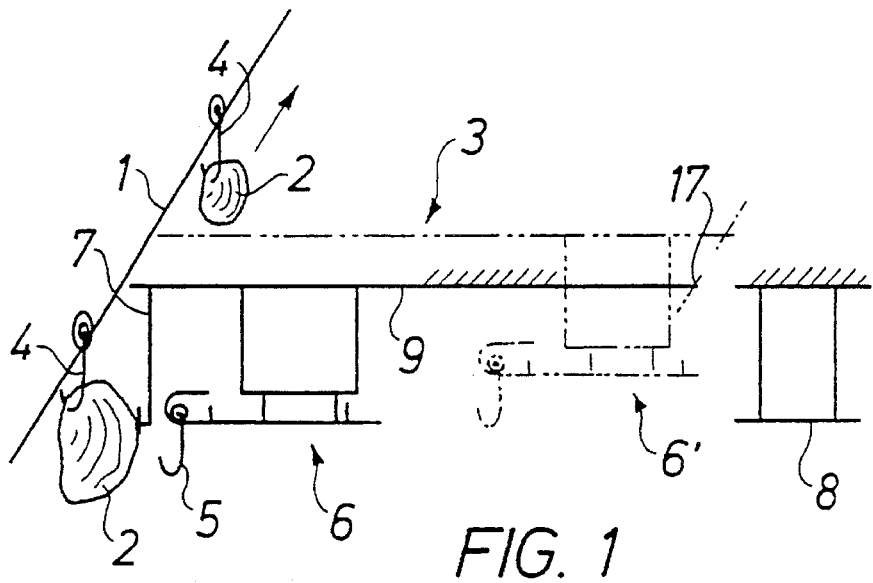
FIG. 1 is a schematic diagram of a work station of the present invention arranged near a main conveyor.

The invention is primarily intended to be applied in a conventional conveyor for carcasses. FIG. 1 shows schematically such a main conveyor 1 transporting carcasses 2 to be cut-up. Near the main conveyor 1 a work station 3 according to the present invention is located. The work station serves to separate the parts from the carcasses 2. These may be skeleton parts, meat parts, connective tissue, fatty tissue or combinations thereof, according to the actual application. The different parts are conveniently transported by meat-hooks, being the most hygienic tool for transporting meat. The meat-hooks on the main conveyor are designated by 4, while the meat-hook of the work station is designated by 5.

What is primarily distinguishing the present invention from he prior art is that the meat-hook 5 of the work station 3 may be moved up and down vertically and back and forth horizontally, independently of each other. In the prior art, the cutting-up was performed along the main conveyor and there was no freedom to move the hooks and supports vertically and in both directions horizontally. The meat-hook 5 is carried by a carrier 6, the movement of which may be determined arbitrarily. The carrier 6 is suspended in a conveyor portion 9. The devices controlling the movement of the carrier 6 may be controlled by appropriate timing programs or by direct control by the operator serving the work station. In this connection, the operator utilizes controls placed on or near the work station or he uses a portable remote control, e.g. carried in a belt.

Optionally the work station may comprise a support 7 pressing against the carcass in opposition to the force of the meat-hook 5 attached to the part to be separated. The support 7 may be adjusted in height and size-and may be folded away completely.

The operator monitors the operation of the work station and preferably performs manual cuts to perform a separation. When the part is separated it is transported by the carrier to a subsequent line 8, conveyor or another work station. Then the meat-hook 5 is docked from the carrier to the subsequent station.

A cutting by means of the present invention is performed essentially as follows. A carcass 2 is brought in position at a work station 3. While the carcass is still hanging on its meat-hook 4 on the main conveyor a second meat-hook 5 is applied, on the one hand, in he part to be separated, and on the other hand, is suspended on the carrier 6. Thereafter, the carrier starts to move the meat-hook 5 in some direction from the main conveyor 1. At the same time the operator makes cuts. In some cases, cuts may also be performed mechanically. The movement of the conveyor 6 is determined in dependence of the particular cutting to be performed. For instance, possible first to move the carrier downwards and right, as seen in FIG. 1, and then bring the carrier back the left horizontally to avoid rupturing muscles in sensitive pieces of meat. The position, speed and force of the carrier are monitored the whole time by the predetermined program as well as directly by the operator. When the part is separated from the carcass 2 the carrier is moved away to the subsequent line 8 for transferring the meat-hook 5 thereto. Then the carrier 6 returns for the next cutting operation.

Alternatively, the work-station 3 may comprise two carriers which are used alternatingly, such that one (6) is active for cutting operations, while the other (6'), shown in broken lines in FIG. 1 returns from the subsequent station 8 for the next cutting operation. In this way, he time of the return movement of the carrier is avoided.

Figure 2:
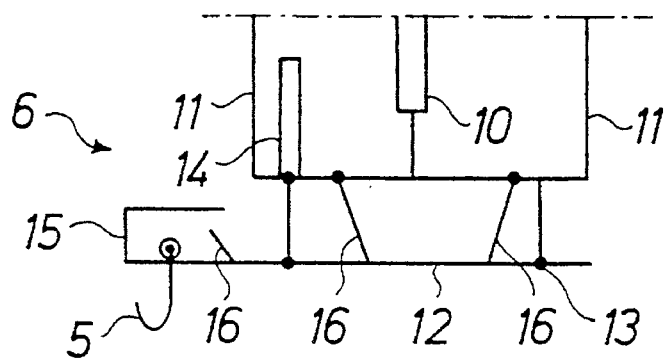
FIG. 2 is a schematic elevation of a carrier of the invention, and FIGS. 3A and B are schematic diagrams of various forms of plants according to the present invention.

FIG. 2 shows a preferred embodiment of the carrier 6 in some detail. The carrier is suspended from an overhead conveyor portion, as is mentioned above. The carrier s suspended by a vertical cylinder 10 and two supporting posts 11. The cylinder 10 provides the movement of the carrier in the vertical direction. The carrier comprises a support rail 12 which may be suspended rigidly, or as is shown in the figure, suspended pivotable around a joint 13. The rotational movement is provided by a cylinder 14. It will be appreciated that the cylinders 10 and 14 may be replaced by other means having similar functions, such as ball bearing screws.

The support rail 12 supports the above-mentioned meat-hook 5 and for this reason is provided with a catch 15 at one end and hook stops 16. The catch 15 is curved such meat-hook 5 may be loaded in any direction without falling off. The hook stops 16 are released when the meat-hook is be docked to the subsequent station. Before the cutting-up it is also possible to release the meat-hook manually by simply lifting it from the support rail 12 in order to attach the hook in the part to be separated and thereafter putting it back on the carrier if this is advantageous in the actual application.

It will be appreciated that the meat-hook 5 may be moved in any direction in a vertical plane formed by the overhead rail and meat-hook. The work station may also be simplified, if necessary, if only a vertical movement is useful in the separation. It is also possible to construct a linear robot performing the work of the work station.

Also, the whole work station 3 may be pivoted at the rear end 17, so that the front end near the main conveyor 1 may be lowered by means of a cylinder (not shown).

Figures 3A, 3B:
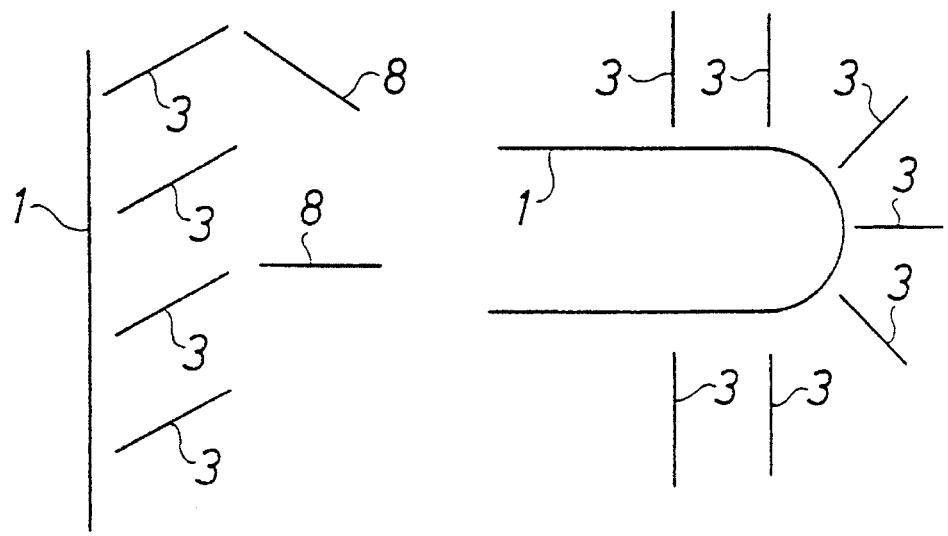

The meat-hooks 4 on the main conveyor may be turned in any angle. Thus, there is complete freedom to arrange the work stations 3 in any angular position relative to the main conveyor. FIGS. 3A and B show examples of plants having several work stations 3 in accordance with the present invention.

In FIG. 3A the main conveyor 1 is straight. Several work stations 3 are arranged near the main conveyor 1 in an oblique angle for an optimum exploitation of the space. The lines, conveyors or work stations 8 following the first work stations may in turn be arranged in any angular position.

In FIG. 3B the main conveyor 1 is curved, which does not cause any problem. The work stations 3 herein are arranged perpendicularly to the main conveyor, i.e. in an approximately fan-shaped arrangement. Here, too, the work stations may of course be arranged in an oblique angle to the main conveyor.

The main conveyor 1 may be driven in various ways. One possibility is to stop the main conveyor when carcasses 2 are in a position at every work station 3 during an appropriate duration, i.e. 15 seconds, such that each work station has time to perform its operation.

Also, it is possible to let the main conveyor transport the carcasses continuously. In this case, the work stations 3 follow at essentially the same speed as the main conveyor.

The work stations may e.g. be suspended on an overhead conveyor (not shown) extending in the same direction as the main conveyor. The operator also walks along, as is already conventional in the simple plants of today. The main conveyor needs only to be stopped at the return of the work station. It is also possible to design a plant in which a new work station always is available in the right position when a work station has performed its operation, e.g. by suspending the work stations on an overhead conveyor of an endless type.

Thus, the present invention provides a plant for separating a part from a carcass which results in a further rationalization of the previously known technique. The cutting-up may be performed with higher precision by means of more accurate control of the movement of the meat-hook providing the separating force, resulting in simpler cutting-up for the operator and higher quality of the meat. The separate work stations also enable a more compact design of the cutting plant as a whole, thanks to the flexibility in size and specialization of the individual work stations. Various modifications of the technical solution, such as the design of the meat-hooks, the carrier, the cylinders, hook-stops etc. can be made by a person skilled in the art. These modifications are considered to fall within the scope of the invention. The scope of the invention is only limited by the claims below.

I claim:

1. Apparatus for separating a part from a carcass, comprising:

a main conveyor for transporting the carcass suspended from a first meat-hook on the main conveyor; a separate work station arranged near the main conveyor for separating and forwarding the separated part said work station comprising a second meat-hook for attaching in the part to be separated, means for moving the second meat-hook substantially in a direction away from the first meat-hook, such that the part is separated from the carcass without any other cutting action; and control means guiding selectively vertically and/or horizontally the movement of the second meat-hook.

2. Apparatus according to claim 1, wherein the separate work station comprises an adjustable support serving as an abutment against the carcass when separating the part.

3. Apparatus according to claim 1, wherein the moving means comprises a linear robot having at least two degrees of freedom.

4. Apparatus according to claim 1, wherein the work station comprises a separate conveyor portion for separating the part and transporting this to another work station.

5. Apparatus according to claim 4, wherein a carrier is suspended from the conveyor portion for movement along therewith, said carrier comprising a support rail for supporting the second meat-hook, and hook stops arranged on the support rail for holding the second meat-hook and releasing it when docking at said other work station.

6. Apparatus according to claim 5, wherein the carrier may be raised and lowered relative to the main conveyor independently of the horizontal component of the separation movement.

7. Apparatus according to claim 5, wherein the carrier is suspended such that it may be rotated in a vertical plane independently of the other separation movement.

8. Apparatus according to claim 5, wherein two carriers are arranged on the conveyor portion, one carrier being active performing separation and transport, and the other carrier being passive and only returning to the main conveyor after having delivered a separated part at said other work station.

9. Apparatus according to claim 5, wherein several separate work stations are arranged at the main conveyor, each in an individually set angle to the main conveyor and individually controllable mode of operation.

10. Apparatus according to claim, wherein the main conveyor transports the carcasses at a certain speed during the separation, each work station following the main conveyor at essentially the same speed.

11. Apparatus according to claim 1, wherein the part is separated from the carcass with assistance of other cutting action of mechanical cuts or by an operator, and said control means includes a predetermined timing program for controlling the moving means.

12. Apparatus according to claim 1, wherein the work station comprises a separate conveyor portion for separating the part and transporting the part to another conveyor.

13. Apparatus according to claim 12, wherein a carrier is suspended from the conveyor portion for movement along therewith, said carrier comprising a support rail for supporting the second meat-hook, and hook stops arranged on the support rail for holding the second meat-hook and releasing it when docking at said other conveyor.

14. Apparatus according to claim 13, wherein the carrier may be raised and lowered relative to the main conveyor independently of the horizontal component of the separation movement.

15. Apparatus according to claim 13, wherein the carrier is suspended such that it may be rotated in a vertical plane independently of the other separation movement.

16. Apparatus according to claim 13, wherein two carriers are arranged on the conveyor portion, one carrier being active performing separation and transport and the other carrier being passive and only returning to the main conveyor after having delivered a separated part at said other conveyor.

17. A method for separating a part from a carcass, comprising the steps of: transporting a carcass to a work station defined by a first meat-hook hanging from a main conveyor;

attaching a second meat-hook in the part to be separated;

moving the second meat-hook essentially in a direction away from the first meat-hook such that the part is separated from the carcass without other cutting action, wherein the second meat-hook is selectively moved up and down vertically, as well as back and forth horizontally.

18. A method according to claim 17, wherein the movements of the second meat-hook is guided by a predetermined control means.

19. A method according to claim 17, wherein the movement of the second meat-hook is essentially in a vertical direction.

20. A method according to claim 17, wherein the movement of the second meat-hook is in a vertical direction and horizontal direction independent of each other.

21. A method according to claim 17, wherein the work station docks the second meat-hook carrying the separated part with a subsequent work station.

22. A method according to claim 17, wherein the main conveyor is driven essentially continuously at a certain speed, the work station following the main conveyor at essentially the same speed.

23. A method according to claim 17, wherein the work station docks the second meat-lock carrying the separated part with a subsequent conveyor.

24. A method for separating a part from a carcass, comprising the steps of:

transporting a carcass to a work station defined by a first meat-hook hanging on a main conveyor;

attaching a second meat-hook in the part to be separated;

moving the second meat-hook essentially in a direction away from the first meat-hook, such that the part is separated from the carcass with assistance of other cutting action of mechanical cuts or by an operator, wherein the second meat-hook may be moved up and down vertically as well as back and forth horizontally.

* * * * *